United States Patent
Taylor et al.

(10) Patent No.: US 8,505,864 B1
(45) Date of Patent: Aug. 13, 2013

(54) PV KIT FOR ROOF ASSEMBLY

(75) Inventors: Martin Taylor, Terryville, CT (US); Tamas Kovacs, Bristol, CT (US)

(73) Assignee: IMP Inc., Plainville, CT (US)

( * ) Notice: Subject to any disclaimer, the term of this patent is extended or adjusted under 35 U.S.C. 154(b) by 24 days.

(21) Appl. No.: 13/385,644

(22) Filed: Feb. 29, 2012

(51) Int. Cl.
*A47G 29/02* (2006.01)

(52) U.S. Cl.
USPC ............. 248/237; 248/226.12; 52/173.3

(58) Field of Classification Search
USPC ........... 52/173.3; 126/623; 248/237, 226.12, 248/906
See application file for complete search history.

(56) References Cited

U.S. PATENT DOCUMENTS

| | | | | |
|---|---|---|---|---|
| 4,150,660 A * | 4/1979 | Peters et al. | | 126/598 |
| 5,121,583 A * | 6/1992 | Hirai et al. | | 52/90.1 |
| 6,672,018 B2 * | 1/2004 | Shingleton | | 52/173.3 |
| 7,435,134 B2 * | 10/2008 | Lenox | | 439/567 |
| 7,435,897 B2 * | 10/2008 | Russell | | 136/244 |
| 7,600,349 B2 * | 10/2009 | Liebendorfer | | 52/173.3 |
| 7,748,175 B2 * | 7/2010 | Liebendorfer | | 52/173.3 |
| 7,758,011 B2 * | 7/2010 | Haddock | | 248/500 |
| 7,780,472 B2 * | 8/2010 | Lenox | | 439/567 |
| 7,956,280 B2 * | 6/2011 | Kobayashi | | 136/251 |
| 8,156,697 B2 * | 4/2012 | Miros et al. | | 52/173.3 |
| 8,181,402 B2 * | 5/2012 | Tsuzuki et al. | | 52/173.3 |
| 8,266,848 B2 * | 9/2012 | Miros et al. | | 52/173.3 |
| 2008/0010915 A1 * | 1/2008 | Liebendorfer | | 52/173.3 |
| 2009/0250580 A1 * | 10/2009 | Strizki | | 248/309.1 |
| 2010/0269430 A1 * | 10/2010 | Haddock | | 52/173.3 |
| 2011/0192098 A1 * | 8/2011 | Chung | | 52/173.3 |
| 2011/0214365 A1 * | 9/2011 | Aftanas | | 52/173.3 |
| 2011/0239546 A1 * | 10/2011 | Tsuzuki et al. | | 52/11 |
| 2011/0271611 A1 * | 11/2011 | Maracci et al. | | 52/173.3 |

* cited by examiner

*Primary Examiner* — Bradley Duckworth

(57) ABSTRACT

An arrangement for attaching PV panels together and to a roofing clamp includes an electrical insulating provision between the attaching arrangement and the roofing clamp.

8 Claims, 2 Drawing Sheets

PV KIT FOR ROOF ASSEMBLY

BACKGROUND OF THE INVENTION

Photovoltaic (PV) cells and panel assemblies are currently attached to roof seams for receiving solar energy and converting the solar energy to electricity for home use. On such PV panel assembly is a Mage Solar Unit manufactured by Mage Solar Inc.

In order to attach the PV panels to the roof seams, roofing clamps such as the AceClamp® manufactured by PMCI of Bristol Conn. for attaching snow guards and the like, can be modified for attaching the PV panels.

Another arrangement for attaching PV panels to roof seams is the type described within U.S. Pat. No. 7,758,011 entitled "Adjustable Mounting Assembly for Standing Seam Panels".

Such forms of attaching PV panels to roof seams mainly consist of an arrangement of metal components which insures electrical connection between adjoining panels that are attached by a common clamp for grounding purposes.

When such PV panels are to be attached to metal roofs, it is important that the panels remain electrically interconnected without becoming electrically connected with the clamp and/or the metal roof.

One purpose of the instant invention is to describe a PV panel clamp for attaching a PV panel to a roof without electrical conduction between the clamp and roof while insuring electrical connection between adjoining PV panels, per se.

SUMMARY OF THE INVENTION

An arrangement for attaching PV panels together and to a roofing clamp includes an electrical insulating provision between the attaching arrangement and the roofing clamp to insure electrical connection between adjoining panels while preventing electrical contact with the roof and attaching arrangement.

DESCRIPTION OF THE PREFERRED EMBODIMENT

Figure 1:
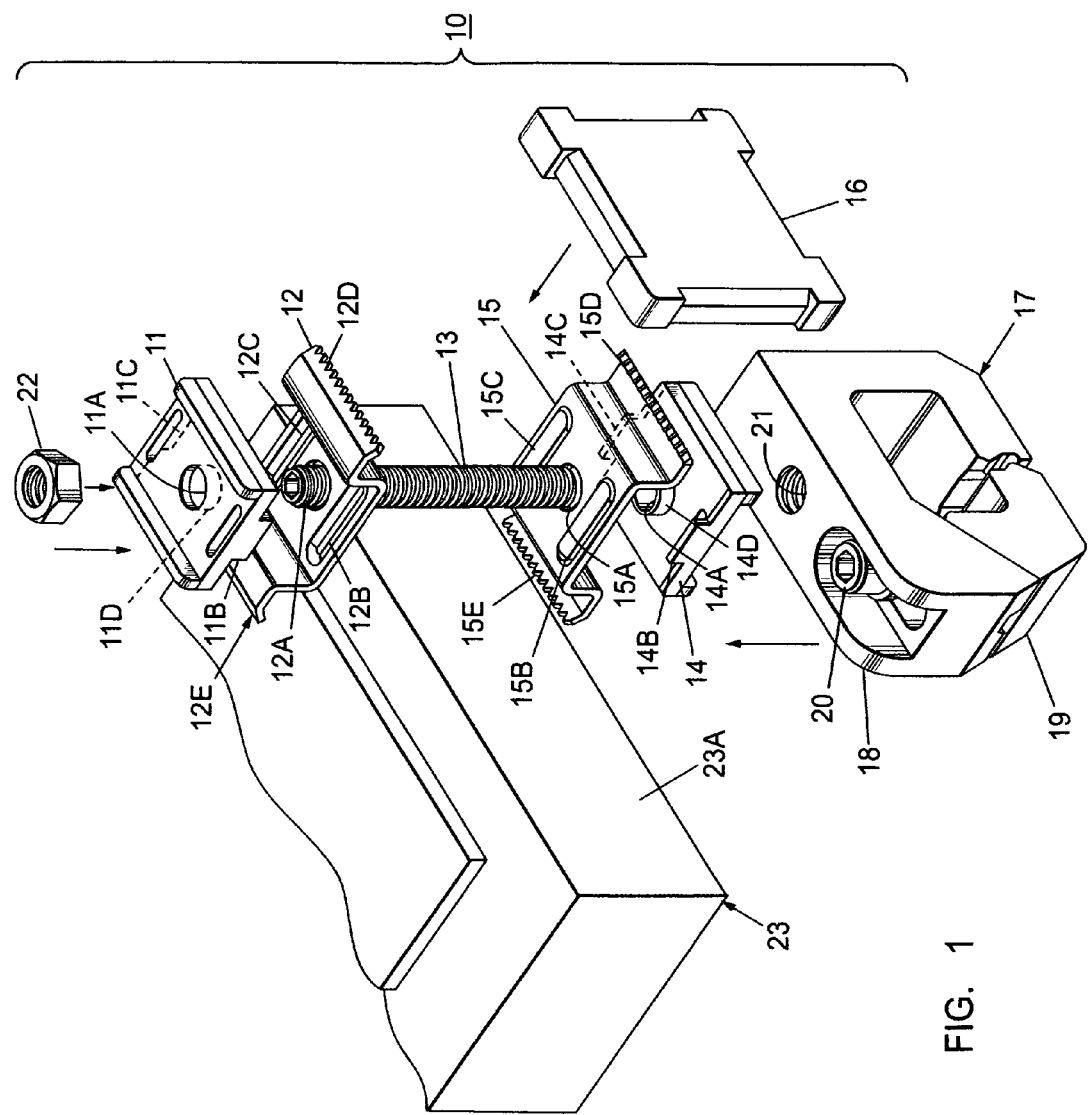
FIG. 1 is a an exploded top perspective view of the PV kit according to the invention, prior to assembly with the associated PV panel and associated roofing clamp.

As now shown in FIG. 1 the PV kit 10 according to the invention includes an upper insulating plate 11 of a plastic material, such as polyphthalamide, which includes a thru-hole 11A for receiving one end of a threaded rod 13 and opposing tabs 11B and 11C extending downwards therefrom along with a circular rim 11D for purposes to be described below in greater detail.

A lower insulating plate 14 of similar material and structure is depicted at the opposite end of the threaded rod 13 with a thru-hole 14A for receiving the opposite end of the threaded rod 13 and opposing tabs 14B and 14C extending upwards therefrom along with a circular rim 14D.

Intermediate the upper and lower insulating plates 11, 14, are a pair of top and bottom wing-shaped metal connector plates 12, 15. The top connector plate 12 includes a thru-hole 12A for receiving the top end of the threaded rod 13 along with a pair of parallel elongated slots 12B, 12C for receiving the opposing tabs 11B and 11C extending downwards from the upper insulating plate 11 when the upper insulating plate is positioned within the top wing-shaped metal connector plate 12 upon receiving the top part of the threaded rod 13 within the thru-hole 11A.

The bottom connector plate 15 includes a thru-hole 15A for receiving the bottom end of the threaded rod 13 along with a pair of parallel elongated slots 15B, 15C for receiving the opposing tabs 14B and 14C extending upwards from the lower insulating plate 14 when the lower insulating plate 14 becomes positioned within the bottom wing-shaped metal connector plate 15 upon receiving the bottom part of the threaded rod 13 within the thru-hole 14A.

To insure separation between the top and bottom connector plates 12, 15 and the threaded rod 13, the circular rim 11D, extends from the upper insulating plate 11 to within the thru-hole 12A within the top connector plate 12 when the upper insulating plate 11 is inserted within the top connector plate 12, and the circular rim 14D extends from the lower insulating plate 14 to within the thru-hole 15A within the bottom connector plate 15 when the lower insulating plate 14 is inserted within the bottom connector plate 15. The prevention of contact between the top and bottom connector plates 12,14, and the threaded rod 13 is an important feature of the instant invention.

After inserting the top end of the threaded rod 13 within thru-holes 11A, 12A, and the lower end of the threaded rod within thru-holes 15A, 14A, within the threaded opening 21 formed on the top part of the roofing clamp 17, the side wall 23A of the associated PV panel 23 is then inserted between the serrated end 12E of the top connector plate 12 and the end serrated 15E of the bottom connector plate 15, while a rectangular insulating side plate 16 of a plastic material is positioned intermediate the serrated end 12D of the top connector plate 12 and the serrated end 15D of the bottom connector plate 15. The serrated ends of the connector plates insure firm mechanical and electrical contact between the PV panel 23 and the top connector plate. The rectangular insulating side plate 16 prevents the PV kit assembly 10 from becoming unstable under severe atmospheric conditions.

Figure 2:
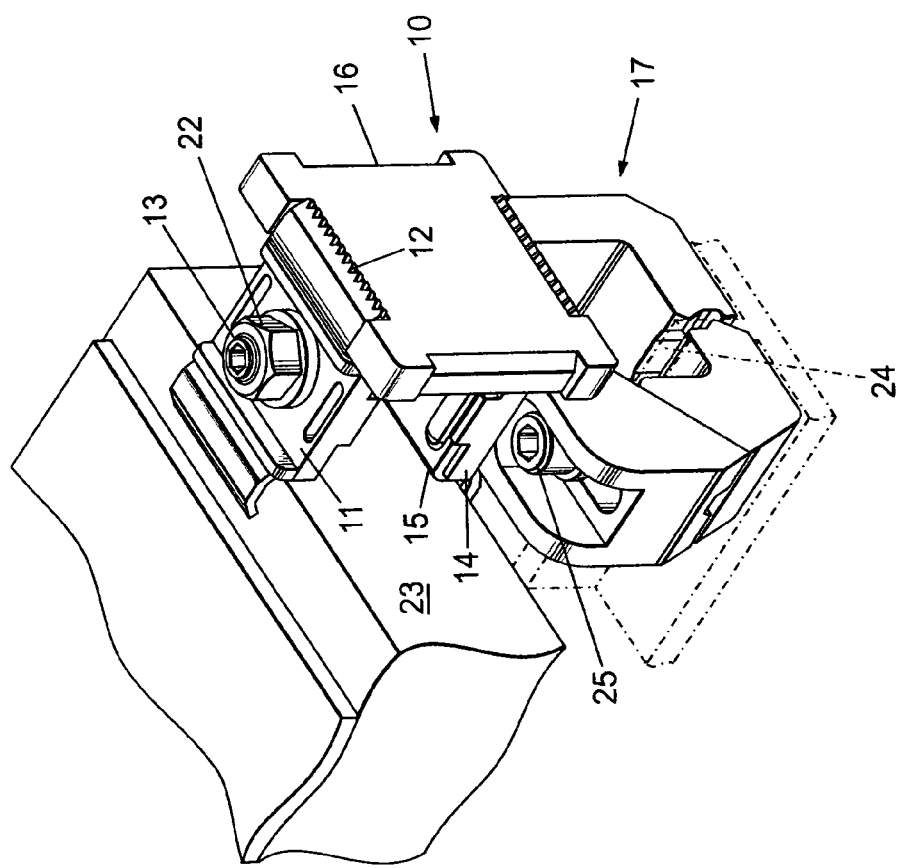
FIG. 2 is a top perspective view of the PV kit of FIG. 1 shown attached to the PV panel and with a roofing seam via the associated roofing clamp.

Although not shown for purposes of clarity, a similar PV panel 23 could be installed between the end 12D of the top connector plate 12 and the end 15D of the bottom connector plate 15 in place of the rectangular insulating side plate 16, if so desired. The PV kit assembly 10 is shown in FIG. 2 with the PV panel 23 captured between one side of the top metal plate 12 and one side of the bottom metal plate 15 and with the plastic side piece 16 captured between an opposite side of the top metal plate and an opposite side of the bottom metal plate.

The upper insulating plate 11 and the lower insulating plate 14 captured within the top and bottom metal plates 12, 15, prevent electrical connection between the top and bottom metal plates, the rod 13, as well as between the roofing clamp 17 when the roofing seam 24 is captured within the roofing clamp via nut 25 and the PV kit assembly 10 is attached to the roofing clamp via rod 13 and nut 22, as shown.

A PV assembly kit for attaching solar panels and the like to roofing seams has herein been described along with means for allowing electrical contact between adjoining panels without allowing electrical connection between the panels and the associated roof.

What is claimed is:

1. An arrangement for attaching PV panels to a roof comprising:

a threaded rod; a top metal plate arranged at one end of said rod, said top metal plate having first means at opposite ends for connecting with a corresponding PV panel; an upper electrical insulating plate arranged on said one end of said rod for electrically insulating said one end of said rod from said top metal plate; a bottom metal plate arranged at an opposing end of said rod, said bottom metal plate having second means at opposite ends for connecting with said corresponding PV panel; and a lower electrical insulating plate arranged on said opposing end of said rod for electrically insulating said opposing end of said rod from said bottom metal plate.

2. The arrangement of claim 1 wherein said upper insulating plate defines an opposing pair of upper opposing tabs extending therefrom and said top metal plate includes a pair of top opposing slots arranged for receiving said upper opposing tabs therein.

3. The arrangement of claim 1 wherein said top metal plate includes a top metal plate thru-hole for receiving said one end of said rod and said bottom metal plate includes a bottom metal plate thru-hole for receiving said opposite end of said rod.

4. The arrangement of claim 1 wherein said upper insulating plate includes an upper insulating plate thru-hole for receiving said one end of said rod and said bottom insulating plate includes a bottom insulating plate thru-hole for receiving said opposite end of rod.

5. The arrangement of claim 1 wherein said upper insulating plate further includes an upper insulating plate circular rim for receiving said one end of said rod to provide electrical insulation between said top metal plate and said rod.

6. The arrangement of claim 1 wherein said lower insulating plate further includes a lower insulating plate circular rim for receiving said opposite end of said rod to provide electrical insulation between said bottom metal plate and said rod.

7. The arrangement of claim 1 wherein said first means at opposite ends for connecting with corresponding PV panels comprises serrations.

8. The arrangement of claim 1 including a roofing clamp having a threaded opening on a top surface for receiving said opposite end of said threaded rod to secure said PV panel to a roof.

* * * * *